(12) United States Patent
Carlsson et al.

(10) Patent No.: US 12,739,357 B2
(45) Date of Patent: Sep. 15, 2026

(54) AUTOSTEREOSCOPY WITH FOCUS DEPTH GUIDANCE BASED ON EYE DOMINANCE

(71) Applicant: Distance Technologies Oy, Helsinki (FI)

(72) Inventors: Thomas Carlsson, Vantaa (FI); Mikko Strandborg, Hangonkylä (FI)

(73) Assignee: Distance Technologies Oy, Helsinki (FI)

( * ) Notice: Subject to any disclaimer, the term of this patent is extended or adjusted under 35 U.S.C. 154(b) by 232 days.

(21) Appl. No.: 18/769,611

(22) Filed: Jul. 11, 2024

(65) Prior Publication Data

US 2026/0019552 A1 Jan. 15, 2026

(51) Int. Cl.

*H04N 13/302* (2018.01)
*G06T 5/70* (2024.01)
*G06T 5/73* (2024.01)
*G06T 5/90* (2024.01)
*G06T 15/00* (2011.01)
*H04N 13/383* (2018.01)

(52) U.S. Cl.

CPC ............. *H04N 13/302* (2018.05); *G06T 5/70* (2024.01); *G06T 5/73* (2024.01); *G06T 5/90* (2024.01); *G06T 15/00* (2013.01); *H04N 13/383* (2018.05)

(58) Field of Classification Search

CPC ...... H04N 13/302; H04N 13/383; G06T 5/70; G06T 5/73; G06T 5/90; G06T 15/00; G02B 2027/0185; G02B 27/0093; G02B 30/26; G02B 2027/0127; G02B 2027/014; G02B 2027/0187; G02B 27/0101

See application file for complete search history.

(56) References Cited

U.S. PATENT DOCUMENTS

2014/0200079 A1* 7/2014 Bathiche ................. A63F 13/25 348/54
2014/0362446 A1* 12/2014 Bickerstaff ........ G02B 27/0093 359/630
2021/0096368 A1 4/2021 Carlsson et al.
2021/0132693 A1* 5/2021 Pulli .................. G02B 27/0093

OTHER PUBLICATIONS

Akeley et al. "A Stereo Display Prototype with Multiple Focal Distances" Computer Graphics. SIGGGRAPH 2000 Conference Proceedings, Jul. 23-29, 2000, DOI: 10.1145/1186562.1015804, 10 pages.

European Patent Office, Extended European Search Report, Application No. 25180632.9, mailed Oct. 29, 2025, 5 pages.

* cited by examiner

*Primary Examiner* — Chan S Park
*Assistant Examiner* — Emily Rose Hauk
(74) *Attorney, Agent, or Firm* — Ziegler IP Law Group, LLC.

(57) ABSTRACT

Light field images are displayed via a light field display unit to produce a synthetic light field presenting at least one virtual object to a given user. When it is detected that a difference between a focus depth at which the given user is gazing and a given optical depth at which the at least one virtual object is being presented is more than a predefined threshold difference, at least one of: dimming, blurring, is performed on a virtual image to be presented to a non-dominant eye of the given user. A current light field image is generated by utilising this virtual image and another virtual image to be presented to a dominant eye. The current light field image is displayed via the light field display unit to produce a current synthetic light field presenting the at least one virtual object.

14 Claims, 3 Drawing Sheets

AUTOSTEREOSCOPY WITH FOCUS DEPTH GUIDANCE BASED ON EYE DOMINANCE

TECHNICAL FIELD

The present disclosure relates to systems for facilitating autostereoscopy with focus depth guidance based on eye dominance. The present disclosure also relates to methods for facilitating autostereoscopy with focus depth guidance based on eye dominance.

BACKGROUND

A glasses-free augmented-reality (AR) system (for example, such as an automotive heads-up display (HUD) or similar) typically comprises a light field display unit and an optical combiner that optically combines a synthetic light field produced by the light field display unit with a real-world light field. The synthetic light field is produced to present at least one virtual object to a user.

However, the user may struggle to find a correct focus when viewing a given virtual object. This problem often arises when the given virtual object is presented at an optical depth that is smaller than a native optical depth of the AR system. The native optical depth is defined by a sum of a first distance between the user's eyes and the optical combiner and a second distance between the optical combiner and the light field display unit. In a typical HUD, the native optical depth may, for example, lie in a range of 0.5 metre to 3 metre.

Quickly finding the correct focus when viewing the given virtual object that is presented at such an optical depth (that is smaller than the native optical depth) can be jarring. This is because a gaze focus jitter (namely, a jitter experienced by the user's eyes when the user's eyes try to find a correct focus depth and try to achieve a gaze lock) in such a case is larger than usual. In fact, the user's gaze may even bounce between two different optical depths before the user is able to achieve the gaze lock. This could lead to discomfort and eye fatigue, and potentially cause headache, nausea and dizziness.

Moreover, dirt or water droplets (for example, such as rain drops) on a surface of the optical combiner could create an additional focus conflict. As an example, a virtual object that is presented approximately at the native optical depth may be perceived by the user to be at another optical depth that is further away from the user as compared to the native optical depth. A difference between the native optical depth and the another optical depth may, for example, lie in a range of 2 centimetres to 10 centimetres.

Therefore, in light of the foregoing discussion, there exists a need to overcome the aforementioned problem.

SUMMARY

The present disclosure seeks to provide a system and a method for assisting a user with near-field focus when viewing a virtual object being presented via a synthetic light field augmenting a real-world light field. The aim of the present disclosure is achieved by a system and a method for facilitating autostereoscopy with focus depth guidance based on eye dominance, as defined in the appended independent claims to which reference is made to. Advantageous features are set out in the appended dependent claims.

Throughout the description and claims of this specification, the words "comprise", "include", "have", and "contain" and variations of these words, for example "comprising" and "comprises", mean "including but not limited to", and do not exclude other components, items, integers or steps not explicitly disclosed also to be present. Moreover, the singular encompasses the plural unless the context otherwise requires. In particular, where the indefinite article is used, the specification is to be understood as contemplating plurality as well as singularity, unless the context requires otherwise.

DETAILED DESCRIPTION OF EMBODIMENTS

Figure 1:
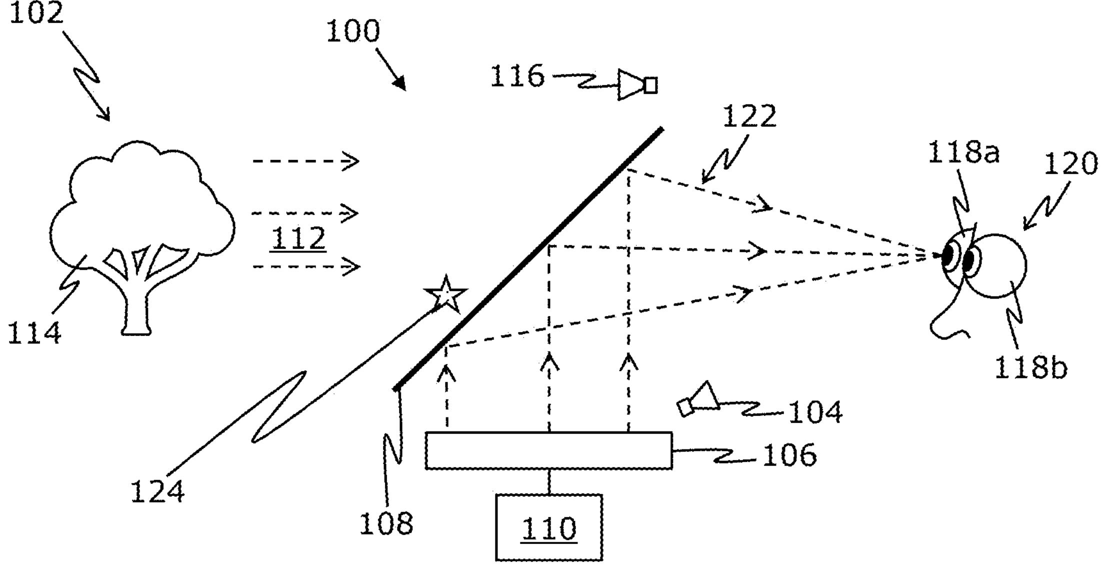
FIG. 1 illustrates an example implementation of a system for facilitating autostereoscopy with focus depth guidance based on eye dominance, in accordance with an embodiment of the present disclosure.

The following detailed description illustrates embodiments of the present disclosure and ways in which they can be implemented. Although some modes of carrying out the present disclosure have been disclosed, those skilled in the art would recognize that other embodiments for carrying out or practising the present disclosure are also possible.

In a first aspect, an embodiment of the present disclosure provides a system comprising:

- tracking means;
- a light field display unit;
- an optical combiner arranged on an optical path of the light field display unit and on an optical path of a real-world light field of a real-world environment; and
- at least one processor configured to:
  - determine a relative location of a dominant eye and of a non-dominant eye of a given user with respect to the optical combiner, by utilising the tracking means;
  - generate a light field image, based on the relative location of the dominant eye and of the non-dominant eye with respect to the optical combiner;
  - display the light field image via the light field display unit to produce a synthetic light field presenting at least one virtual object, wherein the optical combiner is employed to reflect a first part and a second part of the synthetic light field towards the dominant eye and the non-dominant eye of the given user, whilst optically combining the first part and the second part of the synthetic light field with the real-world light field, respectively;
  - repeat the steps of determining, generating and displaying for a given time period;
  - determine gaze directions of the dominant eye and the non-dominant eye during the given time period, by utilising the tracking means;
  - determine a focus depth at which the given user is gazing, based on the gaze directions of the dominant eye and the non-dominant eye;
  - detect, during the given time period, when a difference between the focus depth and a given optical depth at which the at least one virtual object is being presented is more than a predefined threshold difference; and when it is detected that said difference is more than the predefined threshold difference, generate a first virtual image and a second virtual image to be presented to the dominant eye and the non-dominant eye, based on the relative location of the dominant eye and of the non-dominant eye with respect to the optical combiner, respectively;

perform at least one of: dimming, blurring, on the second virtual image to be presented to the non-dominant eye;

generate a current light field image by utilising the first virtual image and the second virtual image; and display the current light field image via the light field display unit to produce a current synthetic light field presenting the at least one virtual object.

In a second aspect, an embodiment of the present disclosure provides a method comprising:

determining a relative location of a dominant eye and of a non-dominant eye of a given user with respect to an optical combiner, by utilising tracking means, wherein the optical combiner is arranged on an optical path of a light field display unit and on an optical path of a real-world light field of a real-world environment;

generating a light field image, based on the relative location of the dominant eye and of the non-dominant eye with respect to the optical combiner;

displaying the light field image via the light field display unit to produce a synthetic light field presenting at least one virtual object, wherein the optical combiner is employed to reflect a first part and a second part of the synthetic light field towards the dominant eye and the non-dominant eye of the given user, whilst optically combining the first part and the second part of the synthetic light field with the real-world 25 light field, respectively;

repeating the steps of determining, generating and displaying for a given time period;

determining gaze directions of the dominant eye and the non-dominant eye during the given time period, by utilising the tracking means;

determining a focus depth at which the given user is gazing, based on the gaze directions of the dominant eye and the non-dominant eye;

detecting, during the given time period, when a difference between the focus depth and a given optical depth at which the at least one virtual object is being presented is more than a predefined threshold difference; and when it is detected that said difference is more than the predefined threshold difference, generating a first virtual image and a second virtual image to be presented to the dominant eye and the non-dominant eye, based on the relative location of the dominant eye and of the non-dominant eye with respect to the optical combiner, respectively;

performing at least one of: dimming, blurring, on the second virtual image to be presented to the non-dominant eye;

generating a current light field image by utilising the first virtual image and the second virtual image; and displaying the current light field image via the light field display unit to produce a current synthetic light field presenting the at least one virtual object.

The present disclosure provides the aforementioned system and the aforementioned method for facilitating autostereoscopy with focus depth guidance based on eye dominance. During the given time period, the aforementioned steps are repeated to produce the synthetic light field, wherein the first part and the second part of the synthetic light field present the first virtual image and the second virtual image (augmenting respective real-world images) to the dominant eye and the non-dominant eye of the given user. By performing the at least one of: dimming, blurring, on the second virtual image (to be presented to the non-dominant eye) when it is detected that the difference between the focus depth and the given optical depth (at which the at least one virtual object is being presented) is more than the predefined threshold difference, the current synthetic light field is produced in such a manner that the at least one virtual object is not clearly visible to the non-dominant eye, while being clearly visible to the dominant eye of the given user. This guides the given user's dominant eye to focus correctly at the at least one virtual object, by allowing the dominant eye to focus at the given optical depth at which the at least one virtual object is being presented. This allows the user to achieve a gaze lock without excessive gaze focus jitter. This technical advantage arises from a fact that human binocular vision fuses the first virtual image and the second virtual image into one, such that a human brain picks up a better quality image, namely the first virtual image. This allows the aforesaid system and method to produce a high-quality synthetic light field that augments the real-world light field viewed by the given user, whilst allowing the user to quickly find the correct focus when viewing the at least one virtual object. The system and the method enable the user to quickly find the correct focus when viewing the at least one virtual object, even in situations where there is dirt or water droplets (for example, such as rain drops) on a surface of the optical combiner, which is known to typically lead to an additional focus conflict in conventional heads-up displays (HUDs). Moreover, the system and the method are robust, fast, reliable, support real-time simultaneous presentation of virtual images (via respective parts of the synthetic light field) to eyes of one or more users.

Moreover, the aforementioned system and the aforementioned method can be leveraged to advantage even in such cases where ghosting artifacts arise due to calibration inaccuracies. In particular, in a near field rendering, a focus conflict may arise where, for example, a given virtual object is presented at an optical depth that is larger than a native optical depth of the light field display unit from the given user, but the given user assumes the given virtual object to be much closer than said optical depth. Such a situation can be easily detected in the aforementioned system and method, and the focus conflict can be beneficially resolved by performing the at least one of: dimming, blurring, on the second virtual image (to be presented to the non-dominant eye), thereby enabling the given user to focus correctly on the given virtual object, namely at the aforesaid optical depth at which the given virtual object is being presented. Throughout the present disclosure, the term "native optical depth" refers to a sum of a first distance between the user's eyes and the optical combiner and a second distance between the optical combiner and the light field display unit. In a typical HUD, the native optical depth may, for example, lie in a range of 0.5 metre to 3 metre.

Pursuant to embodiments, the process of performing the at least one of: dimming, blurring, on the second virtual image (to be presented to the non-dominant eye) may be repeated until it is detected that a difference between a current focus depth and the given optical depth (at which the at least one virtual object is being presented) is not more than the predefined threshold difference. It will be appreciated that the predefined threshold difference may be determined based on the given optical depth at which the at least one virtual object is being presented. As an example, if the given optical depth lies in a range of 0.25 metre to 1.5 metres, the predefined threshold difference can be determined as a predefined percent of the given optical depth. The predefined percent could lie in a range of 2 to 10 percent. As another example, if the given optical depth lies in a range of 0.25 metre to 1.5 metres, the predefined threshold difference can be selected as a value that lies in a range of 2 centimetres to 15 centimetres. As yet another example, if the given optical depth is larger than 2 metres, the predefined threshold difference can be selected as a value that lies in a range of 0.25 metre to 1 metre.

Throughout the present disclosure, the term "tracking means" refers to a specialised equipment for detecting and/or tracking a location of both eyes of a given user. Optionally, the tracking means is implemented as at least one tracking camera. The at least one tracking camera may comprise at least one of: at least one visible-light camera, at least one infrared (IR) camera, at least one depth camera. Examples of such a visible-light camera include, but are not limited to, a Red-Green-Blue (RGB) camera, a Red-Green-Blue-Alpha (RGB-A) camera, a Red-Green-Blue-Depth (RGB-D) camera, a Red-Green-Blue-White (RGBW) camera, a Red-Yellow-Yellow-Blue (RYYB) camera, a Red-Green-Green-Blue (RGGB) camera, a Red-Clear-Clear-Blue (RCCB) camera, a Red-Green-Blue-Infrared (RGB-IR) camera, and a monochrome camera. Examples of such a depth camera include, but are not limited to, a Time-of-Flight (ToF) camera, a light detection and ranging (LiDAR) camera, a Red-Green-Blue-Depth (RGB-D) camera, a laser rangefinder, a stereo camera, a plenoptic camera, a ranging camera, a Sound Navigation and Ranging (SONAR) camera. It will be appreciated that any combination of various different types of cameras (for example, such as the at least one visible-light camera, the at least one IR camera, the at least one depth camera) may be utilised in the tracking means. When different types of images captured by the various different types of tracking cameras are utilised, the location of the user's eyes can be determined highly accurately, as results obtained from one type of image can be used to refine results obtained from another type of image. Herein, these different types of images constitute tracking data collected by the tracking means, and may be in the form of at least one of: visible-light images, IR images, depth images.

The at least one tracking camera is arranged to face the given user, to facilitate tracking of the location of the user's eyes. A relative location of the at least one tracking camera with respect to the optical combiner is fixed, and is pre-known. This enables to determine the relative location of the dominant eye and of the non-dominant eye of the given user with respect to the optical combiner. Optionally, in this regard, when the tracking means are utilised to detect and/or track the location of the dominant eye and of the non-dominant eye, a location of the dominant eye and of the non-dominant eye with respect to the at least one tracking camera is accurately known. Thus, the relative location of the dominant eye and of the non-dominant eye with respect to the optical combiner can be determined, based on the relative location of the at least one tracking camera with respect to the optical combiner and the location of the dominant eye and of the non-dominant eye with respect to the at least one tracking camera. It will be appreciated that the tracking means tracks both eyes of the given user with a significantly high accuracy and precision, such that an error in determining the relative location may, for example, be minimised to within a tolerance range of approximately (+/−) 8 millimetres.

The tracking means is employed to repeatedly track the location of at least the eyes of the given user throughout a given session. This allows for repeatedly determining the relative location of the dominant eye and of the non-dominant eye with respect to the optical combiner in real time or near-real time. Beneficially, this allows for presenting the given user with an augmented view of the synthetic light field with the real-world light field in an autostereoscopic manner. It is to be understood that when the synthetic light field is being produced for a plurality of users simultaneously, relative locations of both eyes of each user from amongst the plurality of users are determined in a same manner as discussed hereinabove.

Moreover, the dominant eye of the given user can be pre-determined using a dominant eye test by an optometrist or other eye specialist. User-specific information indicating the dominant eye of the given user may, for example, be retrieved from a data repository where it is pre-stored. Alternatively or additionally, the dominant eye of the given user can also be pre-determined using any suitable well-known gaze tracking technique. Eye dominance can be represented using a dominance score ranging from 0.0 to 1.0. As an example, a strongly dominant eye could score over 0.8, while a strongly non-dominant eye could score under 0.2. In some users, eye dominance could vary at different optical depths. Optionally, in such cases, the dominant eye is determined based on the given optical depth at which the at least one virtual object is being presented.

In order to allow for determining the gaze directions of the dominant eye and the non-dominant eye, the tracking means comprises gaze-tracking means. In this regard, the at least one processor is configured to utilise the tracking data collected by the tracking means, for determining the gaze directions of the eyes of the given user. Optionally, when the tracking data comprises a plurality of images of a given eye of the given user, the at least one processor is configured to: extract a plurality of features of the given eye from a given image; and determine based on the plurality of features at least one of: a position of a pupil of the given eye with respect to corners of the given eye, a curvature of an eyelid of the given eye, a position of an eyelash of the given eye, a shape of the given eye, a size of the given eye. Gaze tracking is well-known in the art.

Once the gaze directions of both the eyes are determined, the focus depth at which the given user is gazing can be determined based on an interpupillary distance between the eyes of the given user and a convergence of the gaze directions. The focus depth may, for example, be determined using a triangulation technique. Moreover, advanced algorithms based on machine learning models can be utilised to improve an accuracy of focus depth determination by accounting for various factors, for example, such as a position and an orientation of the given user's head, eye characteristics (for example, such as a shape and/or a size of the eyes) specific to the given user, and previous calibration data collected for the given user. The interpupillary distance can be pre-determined by an optometrist. In such a case, the user-specific information may also indicate the interpupillary distance. Alternatively or additionally, the interpupillary distance can also be pre-determined using any suitable well-known gaze tracking technique.

The at least one processor controls an overall operation of the system. The at least one processor is communicably coupled to at least the tracking means and the light field display unit. Optionally, the at least one processor is implemented as a processor of the light field display unit. Alternatively, optionally, the at least one processor is implemented as a processor of a computing device that is communicably coupled to the light field display unit. Examples of the computing device include, but are not limited to, a laptop, a desktop, a tablet, a phablet, a personal digital assistant, a workstation, and a console. Yet alternatively, optionally, the at least one processor is implemented as a cloud server (namely, a remote server) that provides a cloud computing service.

Pursuant to embodiments of the present disclosure, different types of light field display units can be implemented. For example, the light field display unit can be any one of: a hogel-based light field display unit, a lenticular array based light field display unit, a parallax-barrier based light field display unit. The light field display unit could be implemented as a display with or without a backlight. Examples of the display include, but are not limited to, a Liquid Crystal Display (LCD), a Light-Emitting Diode (LED)-based display, a micro LED-based display, an Organic LED (OLED)-based display, a micro OLED-based display, an Active Matrix OLED (AMOLED)-based display, and a Liquid Crystal on Silicon (LCoS)-based display. The light field display unit comprises a multiscopic optical element. Depending on the type of the light field display unit, the multiscopic optical element can be a lenticular array, a parallax barrier, or similar. In this regard, the at least one processor is configured to control the multiscopic optical element, based on the relative location of the dominant eye and of the non-dominant eye with respect to the optical combiner, to direct light produced by a first set of pixels towards the dominant eye, whilst directing light produced by a second set of pixels towards the non-dominant eye.

As mentioned earlier, the light field image is generated based on the relative location of the dominant eye and of the non-dominant eye of the given user with respect to the optical combiner. The light field image may be understood to be a two-dimensional (2D) image comprising a plurality of pixels, wherein a first set of pixels from amongst the plurality of pixels is responsible for generating the first part of the synthetic light field that corresponds to the dominant eye, and a second set of pixels from amongst the plurality of pixels is responsible for generating the second part of the synthetic light field that corresponds to the non-dominant eye. It will be appreciated that the pixels belonging to the first set are not arranged in a continuous manner across the light field image; similarly, the pixels belonging to the second set are also not arranged in a continuous manner across the light field image. Optionally, the pixels belonging to the first set and the pixels belonging to the second set are arranged in alternating vertical stripes across a horizontal field of view of the light field image, wherein each vertical stripe comprises one or more scanlines of pixels. This is because humans perceive depth mainly based on horizontal binocular parallax. Thus, in this way, the light field image would be considerably different as compared to a conventional 2D image that is displayed via conventional 2D displays, because the same light field image would comprise visual information corresponding to the dominant eye as well as the non-dominant eye of the given user.

Throughout the present disclosure, the term "synthetic light field" refers to a light field that is produced (namely, generated) synthetically by the light field display unit, while the term "real-world light field" refers to a light field emanating from the real-world environment in which the given user is present. It will be appreciated that in case of the real-world light field, light from, for example, a natural light source (such as the Sun) and/or an artificial light source (such as a lamp, a bulb, a tube-light, or similar), are reflected off real-world objects (or their portions) to be incident towards the eyes of the given user. In this way, visual information (for example, such as colour information, optical depth information, and the like) pertaining to said real-world objects is typically perceived by the dominant eye and the non-dominant eye. On the other hand, in case of the synthetic light field, light emanating from the light field display unit, upon reflecting off the optical combiner, is incident on the dominant eye and the non-dominant eye of the given user. In this way, visual information pertaining to the at least one virtual object can be perceived by the dominant eye and the non-dominant eye.

Throughout the present disclosure, the term "optical combiner" refers to a specialised equipment that is capable of reflecting a corresponding part of the synthetic light field towards a given eye of the given user, whilst optically combining said part of the synthetic light field with the real-world light field. Optionally, the optical combiner is implemented by way of at least one of: a lens, a mirror, a semi-transparent mirror, a semi-transparent film, a semi-transparent flexible membrane, a prism, a beam splitter, an optical waveguide, a polarizer. Optical combiners are well-known in the art. Optionally, a tilt angle of the optical combiner with respect to an image plane of the light field display unit lies in a range of 10 degrees and 75 degrees.

In some implementations, the at least one virtual object is a part of a virtual environment. Optionally, in such implementations, the at least one processor is configured to generate the light field image from a perspective of the relative location of the dominant eye and the non-dominant eye of the given user with respect to the optical combiner, by employing a three-dimensional (3D) model of the virtual environment. In this regard, the first virtual image and the second virtual image are generated from the perspective of the relative location of the dominant eye and the non-dominant eye of the given user with respect to the optical combiner. The light field image is then generated by utilising the first virtual image and the second virtual image. The term "virtual object" refers to a computer-generated object (namely, a digital object). Examples of the at least one virtual object may include, but are not limited to, a virtual navigation tool, a virtual gadget, a virtual message, a virtual entity, a virtual entertainment media, a virtual vehicle or part thereof, and a virtual information. The term "three-dimensional model" of the virtual environment refers to a data structure that comprises comprehensive information pertaining to the at least one virtual object. Such a comprehensive information is indicative of at least one of: a plurality of features of the at least one virtual object or its portions, a shape and a size of the at least one virtual object or its portions, a pose of the at least one virtual object or its portions, a material of the at least one virtual object or its portions, a colour and an optical depth of the at least one virtual object or its portions. The 3D model may be generated in the form of a 3D polygonal mesh, a 3D point cloud, a 3D surface cloud, a voxel-based model, or similar. Optionally, the at least one processor is configured to store the 3D model at a data repository that is communicably coupled to the at least one processor. The data repository may be implemented as a memory of the at least one processor, a cloud-based database, or similar. In other implementations, the at least one processor is configured to generate the first virtual image and the second virtual image to be presented to the dominant eye and the non-dominant eye of the given user in a form of 2D user interface (UI) elements, and utilise the first virtual image and the second virtual image to generate the light field image. The 2D UI elements could pertain to, for example, a virtual navigation tool, a virtual gadget, a virtual message, a virtual entity, a virtual entertainment media, a virtual information, or similar.

Furthermore, optionally, when generating the light field image, the at least one processor is configured to determine, within the light field image, a position of a given pixel of the first set and a position of a given pixel of the second set that correspond to a given synthetic three-dimensional (3D) point, based on the interpupillary distance between the eyes of the given user and an optical depth at which the given synthetic 3D point is to be displayed. This allows for presenting the given synthetic 3D point at said optical depth, by utilising binocular disparity.

Optionally, the at least one processor is configured to determine a colour of the given pixel of the first set and a colour of the given pixel of the second set, by employing the 3D model of the virtual environment. Optionally, a colour of a given pixel is represented by a colour value. Such a colour value could, for example, be an RGB value, an RGB-A value, a CMYK value, a YUV value, an RGB-D value, an RYYB value, an RGGB value, an RGB-IR value, or similar. Optionally, the at least one processor is configured to employ at least one neural network for determining the colour of the given pixel. Optionally, the at least one neural network is implemented as a Neural Radiance Field (NeRF) model. The NeRF model is well-known in the art.

The aforesaid dimming of the second virtual image (to be presented to the non-dominant eye) can be performed using any suitable well-known technique. Said dimming involves reducing a brightness, namely, an intensity of pixels of the second virtual image. Such dimming can be achieved by increasing a transparency of the second virtual image by a predefined percent. The predefined percent may, for example, lie in a range of 5 percent to 15 percent. Additionally or alternatively, such dimming can be achieved by manipulating intensity values of the pixels directly. This can be achieved, for example, by a linear adjustment technique, a gamma correction technique, applying a darkening filter, an alpha blending with a dark overlay. The linear adjustment technique involves multiplying the intensity values by a factor smaller than 1. The gamma correction technique involves increasing a gamma value. The darkening filter can be applied by subtracting a certain constant value from the intensity values. All these techniques are well-known in the art. Depending on the technique employed for performing dimming, the second virtual image can be dimmed according to a predefined level of dimming. The predefined level of dimming can be expressed in terms of a predefined percent, which may, for example, lie in a range of 5 percent to 15 percent. The predefined level of dimming may be selected to allow for smooth blending of the dimming effect.

The aforesaid blurring of the second virtual image can be performed using any suitable well-known technique. Blurring involves smoothing out details in a given image. Such blurring can be achieved by using various convolution techniques, for example, such as a box blur, a Gaussian blur, a median blur, a bilateral filter, or similar. The box blur involves a simple averaging of the intensity values of pixels within a given kernel size. The Gaussian blur involves use of a kernel that is based on a Gaussian function to provide a weighted average, wherein pixels located at a central part of a given kernel size have a higher weightage. The median blur involves replacing an intensity value of a given pixel with a median value of its neighbouring pixels within a given kernel size. The bilateral filter involves smoothening an images while preserving edges by considering both a spatial distance and an intensity difference between pixels. All these techniques are well-known in the art.

Optionally, said blurring can be performed by utilising a predefined kernel size. The predefined kernel size can be selected based on a resolution of the second virtual image. Moreover, the predefined kernel size can be selected to achieve a predefined level of blurring. The predefined level of blurring may be expressed in terms of a predefined percent, which may, for example, lie in a range of 5 percent to 15 percent. As an example, for a 5 percent blurring using a Gaussian blur, the predefined kernel size can be selected as 3×3 pixels or 5×5 pixels with a low sigma (namely, standard deviation) value. As another example, for a 5 percent blurring using a box blur, the predefined kernel size can be selected as 3×3 pixels or 5×5 pixels. The predefined level of blurring may be selected to allow for smooth blending of the blurring effect.

Optionally, the at least one processor is configured to:

when it is detected that said difference is more than the predefined threshold difference, generate a sequence of pairs of first virtual images and second virtual images to be presented to the dominant eye and the non-dominant eye, based on a sequence of relative locations of the dominant eye and of the non-dominant eye with respect to the optical combiner, respectively, wherein an optical depth at which the at least one virtual object is presented in an $N+1^{th}$ pair of said sequence is closer to the given optical depth and farther away from the focus depth, as compared to an optical depth at which the at least one virtual object is presented in an $N^{th}$ pair of said sequence, generate a sequence of light field images by utilising respective pairs of the first virtual images and the second virtual images of said sequence; and display the sequence of light field images via the light field display unit to produce a sequence of synthetic light fields presenting the at least one virtual object.

In this regard, the sequence of pairs of the first virtual images and the second virtual images are generated to be presented to the dominant eye and the non-dominant eye at different time instants. An initial optical depth at which the at least one virtual object is being presented in an initial pair of said sequence is similar to the focus depth at which the given user is gazing. By similar, it is meant that the initial optical depth is within 10 cm from the focus depth. Then, the optical depth at which the at least one virtual object is presented is adjusted repeatedly and sequentially from the focus depth towards the given optical depth (at which the at least one virtual object is originally intended to be presented) across said sequence of the pairs of the first virtual images and the second virtual images. As an example, said optical depth can be adjusted by 5 centimetres every M number of pairs of the first virtual images and the second virtual images in said sequence. M could, for example, lie in a range of 1 to 5.

This allows for guiding the user's eyes to focus correctly at the at least one virtual object using a slow cycle. Using a slow cycle allows the user's eyes to adapt comfortably. This could even help the user's eyes to focus correctly at a virtual object that is being presented at a first optical depth that is larger than the native optical depth, when the user was incorrectly focusing at a second optical depth that is smaller than the native optical depth (namely, from a "cross-eyed"

focus to the correct focus). This could be potentially useful in cases where ghosting artifacts arise due to calibration inaccuracies.

Moreover, optionally, the at least one processor is configured to:

when it is detected that said difference is more than the predefined threshold difference, determine a first set of pixels and a second set of pixels in the current light field image that correspond to the dominant eye and the non-dominant eye, respectively; and when generating the current light field image, generate intensity values for a subset of the second set of pixels in the current light field image, based on intensity values of the first virtual image to be presented to the dominant eye.

As mentioned earlier, the pixels belonging to the first set are not arranged in a continuous manner across the current light field image; similarly, the pixels belonging to the second set are also not arranged in a continuous manner across the current light field image. Instead, the first set of pixels and the second set of pixels are arranged in a form of alternating vertical stripes across a horizontal field of view of the current light field image, wherein each vertical stripe comprises one or more scanlines of pixels. The intensity values for the subset of the second set of pixels (that originally corresponded to the non-dominant eye) in the current light field image are generated based on the intensity values of the first virtual image (that is to be presented to the dominant eye), instead of intensity values of the second virtual image (that is to be presented to the non-dominant eye). In this regard, the “intensity values of the first virtual image” refer to intensity values of those pixels of the first virtual image whose field of view corresponds to the subset of the second set of pixels. Similarly, the “intensity values of the second virtual image” refer to intensity values of those pixels of the second virtual image whose field of view corresponds to the subset of the second set of pixels. As a result, when the current light field image is displayed, the intensity values for the subset of the second set of pixels in the current light field boosts a brightness and a visual quality of the first virtual image that is being presented to the dominant eye via the current synthetic light field. This is because instead of distributing the pixels of the current light field image equally (namely, into the first set of pixels and the second set of pixels) for presenting the first virtual image and the second virtual image to the dominant eye and the non-dominant eye, respectively, the subset of the second set of pixels can be utilised for presenting both the first virtual image and the second virtual image. In most cases, this may be beneficial to perform because any ghosting artifact produced due to crosstalk would be typically minor.

Optionally, the aforesaid pixels of the second virtual image whose field of view corresponds to the subset of the second set of pixels are selected as those pixels that are at least partially visible to the dominant eye of the given user, when the current light field image is displayed for producing the current synthetic light field.

Additionally or alternatively, optionally, the at least one processor is configured to control the multiscopic optical element, based on the relative location of the dominant eye and of the non-dominant eye with respect to the optical combiner, to direct light produced by the first set of pixels and said subset of the second set of pixels of the current light field image towards the dominant eye, whilst directing light produced by a remainder of the second set of pixels towards the non-dominant eye. A technical benefit of controlling the multiscopic optical element in such a manner is that crosstalk can be reduced, by employing said subset of the second set of pixels of the current light field image for the dominant eye only.

Furthermore, optionally, the at least one processor is configured to:

when it is detected that said difference is more than the predefined threshold difference, perform at least one of: image sharpening, contrast enhancement, edge enhancement, on the first virtual image to be presented to the dominant eye.

A technical benefit of this is that when the current light field image is displayed, the dominant eye of the given user is presented with the first virtual image having an improved contrast, sharpness and/or colour saturation, for example, by up to 20 percent. This improves an overall image quality perceived by the given user. The at least one of: image sharpening, contrast enhancement, edge enhancement can be performed using well-known techniques, for example, such as convolution techniques, or similar. Notably, such techniques can be performed in real time.

Moreover, optionally, the at least one processor is configured to:

detect when the given optical depth at which the at least one virtual object is being presented is smaller than the native optical depth of the light field display unit from the given user; and when it is detected that the given optical depth is smaller than the native optical depth, trigger the steps of determining the gaze directions, determining the focus depth, and detecting when said difference is more than the predefined threshold difference.

A technical benefit of this is that the aforementioned steps can be performed proactively for certain focus depths. It has been observed that users often struggle to find a correct focus when viewing virtual objects that are presented at optical depths that are smaller than the native optical depth. A need for presenting virtual objects at such optical depths could arise, for example, when these virtual objects represent touchable floating icons that extend from a user interface (UI) being provided to the given user. Thus, by triggering the aforementioned steps at such optical depths, it is ensured that such situations are detected proactively, and the given user's eyes are guided to enable her/him to achieve gaze lock without any delay (for example, less than 500 milliseconds).

Furthermore, optionally, the at least one processor is configured to:

determine a baseline pattern of gaze focus jitter for the given user, the baseline pattern indicating at least one of: an amount, a duration for gaze focus jitter;

detect, during the given time period, when a deviation of a current gaze focus jitter from the baseline pattern exceeds a predefined threshold deviation; and when it is detected that said deviation exceeds the predefined threshold deviation, trigger the steps of determining the gaze directions, determining the focus depth, and detecting when said difference is more than the predefined threshold difference.

The baseline pattern of gaze focus jitter can be determined during prior use, when it is detected that a difference between the focus depth (at which the given user is gazing) and a given optical depth at which a given virtual object is being presented is not more than the predefined threshold difference. That is, when the focus depth is similar to the given optical depth, it is expected that the given user's eyes would experience gaze focus jitter according to the baseline pattern. Throughout the present disclosure, the term "gaze focus jitter" refers to a small, involuntary, and rapid movements or fluctuations (often referred to as "jitter") in the gaze directions of the eyes and the focus depth experienced by the user's eyes, when the eyes attempt to maintain a steady gaze on a specific target. A gaze focus jitter takes place when the eyes try to find a correct focus depth and try to achieve a gaze lock. A deviation from the baseline pattern of gaze focus jitter could be indicative of a situation where the given user is finding it difficult to find correct focus when viewing virtual objects being presented by the synthetic light field. In some cases, the user's gaze may even bounce between different optical depths before the user is able to achieve the gaze lock.

The baseline pattern of gaze focus jitter could indicate a typical range for the amount of gaze focus jitter that the user's eyes experience when the difference between the focus depth and the given optical depth is not more than the predefined threshold difference. The term "amount of gaze focus jitter" refers to an angle by which the gaze directions of the eyes fluctuate and/or a distance by which the focus depth fluctuates. The baseline pattern of gaze focus jitter could indicate a typical range for the duration of gaze focus jitter that the user's eyes experience when the difference between the focus depth and the given optical depth is not more than the predefined threshold difference. The term "duration of gaze focus jitter" refers to a time period for which the eyes experience gaze focus jitter before achieving a gaze lock.

In this regard, the predefined threshold deviation can be expressed in terms of a percentage. The predefined threshold deviation could lie in a range of 2 percent to 15 percent; more optionally, in a range of 5 percent to 10 percent. When it is detected that said deviation exceeds the predefined threshold deviation, it serves as a trigger for performing the aforementioned steps. By triggering the aforementioned steps in such a manner, it is ensured that such situations are detected quickly, and the given user's eyes are guided to enable her/him to achieve gaze lock without any delay.

Moreover, optionally, the system further comprises at least one real-world-facing depth camera, wherein the at least one processor is configured to:

- generate a depth image of the real-world environment, by utilising at least one real-world-facing depth camera; and
- detect whether the given user is gazing at a real-world object, by utilising the depth map, based on the gaze direction of the dominant eye; and
- when it is detected that the given user is not gazing at any real-world object, trigger the step of detecting when said difference is more than the predefined threshold difference.

This rules out a possibility that the given user is focusing at a real-world object when gazing at the focus depth, instead of experiencing any difficulties with focusing on the at least one virtual object. The at least one real-world-facing depth camera is arranged to face the real-world environment. The depth image may be reprojected from a pose of the at least one real-world-facing depth camera to a pose of the user's head or the position of the user's eyes. Herein, the term "pose" encompasses both position and orientation. In order to detect whether the given user is gazing at a real-world object, the depth map and the gaze direction of the dominant eye are utilised to determine an optical depth of a real-world object that lies along the gaze direction of the dominant eye. If this optical depth matches the focus depth, it may be considered that the given user is indeed gazing at the real-world object. Such matching need not be an exact match, and can be defined by a predefined percent of difference. This predefined percent could lie in a range of 2 percent to 10 percent. As an example, if said optical depth lies within 5 percent of the focus depth, or vice versa, it may be considered that the optical depth and the focus depth match. Otherwise, it may be considered that the given user is trying to focus correctly on the at least one virtual object being presented via the synthetic light field.

The present disclosure also relates to the method as described above. Various embodiments and variants disclosed above, with respect to the aforementioned first aspect, apply mutatis mutandis to the method.

Optionally, the method further comprises:

- when it is detected that said difference is more than the predefined threshold difference,
  - generating a sequence of pairs of first virtual images and second virtual images to be presented to the dominant eye and the non-dominant eye, based on a sequence of relative locations of the dominant eye and of the non-dominant eye with respect to the optical combiner, respectively, wherein an optical depth at which the at least one virtual object is presented in an $N+1^{th}$ pair of said sequence is closer to the given optical depth and farther away from the focus depth, as compared to an optical depth at which the at least one virtual object is presented in an $N^{th}$ pair of said sequence,
  - generating a sequence of light field images by utilising respective pairs of the first virtual images and the second virtual images of said sequence; and
  - displaying the sequence of light field images via the light field display unit to produce a sequence of synthetic light fields presenting the at least one virtual object.

Optionally, the method further comprises:

- when it is detected that said difference is more than the predefined threshold difference,
  - determining a first set of pixels and a second set of pixels in the current light field image that correspond to the dominant eye and the non-dominant eye, respectively; and
  - when generating the current light field image, generating intensity values for a subset of the second set of pixels in the current light field image, based on intensity values of the first virtual image to be presented to the dominant eye.

Optionally, in this regard, the method further comprises controlling a multiscopic optical element of the light field display unit, based on the relative location of the dominant eye and of the non-dominant eye with respect to the optical combiner, to direct light produced by the first set of pixels and said subset of the second set of pixels of the current light field image towards the dominant eye, whilst directing light produced by a remainder of the second set of pixels towards the non-dominant eye.

Optionally, the method further comprises:

- when it is detected that said difference is more than the predefined threshold difference, performing at least one of: image sharpening, contrast enhancement, edge enhancement, on the first virtual image to be presented to the dominant eye.

Optionally, the method further comprises:

- detecting when the given optical depth at which the at least one virtual object is being presented is smaller than a native optical depth of the light field display unit from the given user; and when it is detected that the given optical depth is smaller than the native optical depth, triggering the steps of determining the gaze directions, determining the focus depth, and detecting when said difference is more than the predefined threshold difference.

Optionally, the method further comprises:

determining a baseline pattern of gaze focus jitter for the given user, the baseline pattern indicating at least one of: an amount, a duration for gaze focus jitter;

detecting, during the given time period, when a deviation of a current gaze focus jitter from the baseline pattern exceeds a predefined threshold deviation; and when it is detected that said deviation exceeds the predefined threshold deviation, triggering the steps of determining the gaze directions, determining the focus depth, and detecting when said difference is more than the predefined threshold difference.

DETAILED DESCRIPTION OF THE DRAWINGS

Referring to FIG. 1, illustrated is an example implementation of a system 100 for facilitating autostereoscopy with focus depth guidance based on eye dominance, in accordance with an embodiment of the present disclosure. The system 100 is shown to be employed in a real-world environment 102. The system 100 comprises tracking means 104, a light field display unit 106, an optical combiner 108, and at least one processor (depicted as a processor 110). The tracking means 104 is shown to be implemented, for example, as at least one tracking camera. The optical combiner 108 is arranged on an optical path of the light field display unit 106 and on an optical path of a real-world light field 112 of the real-world environment 102. In the real-world environment 102, there are one or more real-world objects, depicted as a real-world object 114 (shown as a tree, for illustration purposes only). Optionally, the system 100 further comprises at least one real-world-facing depth camera (depicted as a real-world-facing depth camera 116).

The processor 110 is configured to:

determine a relative location of a dominant eye 118*a* and a non-dominant eye 118*b* of a user 120 with respect to the optical combiner 108, by utilising the tracking means 104;

generate a light field image, based on the relative location of the dominant eye 118*a* and of the non-dominant eye 118*b* with respect to the optical combiner 108; and display the light field image via the light field display unit 106 to produce a synthetic light field 122 presenting at least one virtual object depicted as a virtual object 124 (shown as a star, for illustration purposes only).

For illustration purposes only, the virtual object 124 is shown to be presented at an optical depth that is smaller than a native optical depth of the light field display unit 106. The optical combiner 108 is employed to reflect a first part and a second part of the synthetic light field 122 towards the dominant eye 118*a* and the non-dominant eye 118*b* of the user 120, respectively, whilst optically combining the first part and the second part of the synthetic light field 122 with the real-world light field 112.

The processor 110 is further configured to:

repeat the steps of determining, generating and displaying for a given time period;

determine gaze directions of the dominant eye 118*a* and the non-dominant eye 118*b* during the given time period, by utilising the tracking means 104;

determine a focus depth at which the given user 120 is gazing, based on the gaze directions of the dominant eye 118*a* and the non-dominant eye 118*b;* detect, during the given time period, when a difference between the focus depth and a given optical depth at which the virtual object 124 is being presented is more than a predefined threshold difference; and when it is detected that said difference is more than the predefined threshold difference, generate a first virtual image and a second virtual image to be presented to the dominant eye 118*a* and the non-dominant eye 118*b*, based on the relative location of the dominant eye 118*a* and of the non-dominant eye 118*b* with respect to the optical combiner 108, respectively;

perform at least one of: dimming, blurring, on the second virtual image to be presented to the non-dominant eye 118*b;* generate a current light field image by utilising the first virtual image and the second virtual image; and display the current light field image via the light field display unit 106 to produce a current synthetic light field presenting the virtual object 124.

It may be understood by a person skilled in the art that FIG. 1 includes a simplified example implementation of the system 100, for sake of clarity, which should not unduly limit the scope of the claims herein. It is to be understood that the specific implementation of the system 100 is not to be construed as limiting it to specific numbers or types of tracking means, light field display units, optical combiners, processors, and real-world-facing depth cameras. The person skilled in the art will recognize many variations, alternatives, and modifications of embodiments of the present disclosure.

Figure 2A:
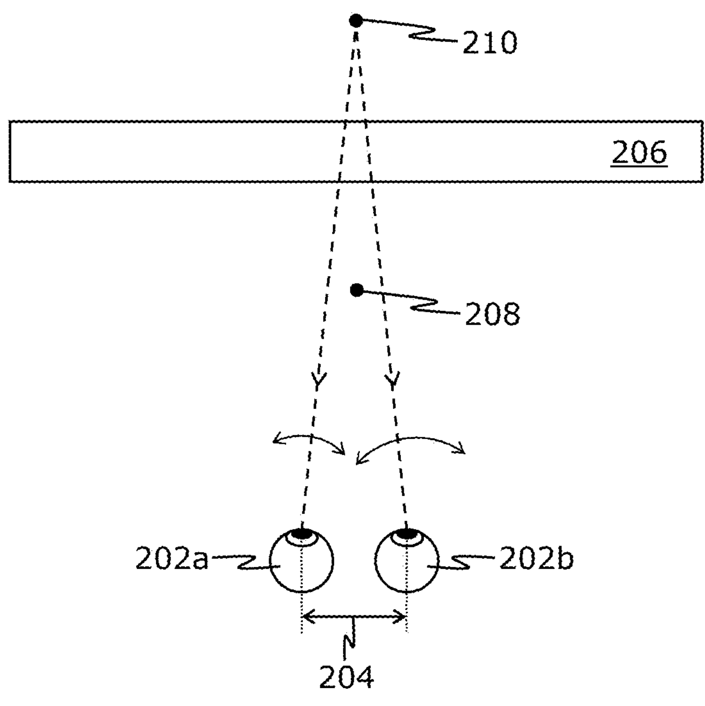
FIGS. 2A and 2B depict an exemplary scenario of how a user's eyes can be guided to focus correctly, in accordance with an embodiment of the present disclosure.
Figure 2B:
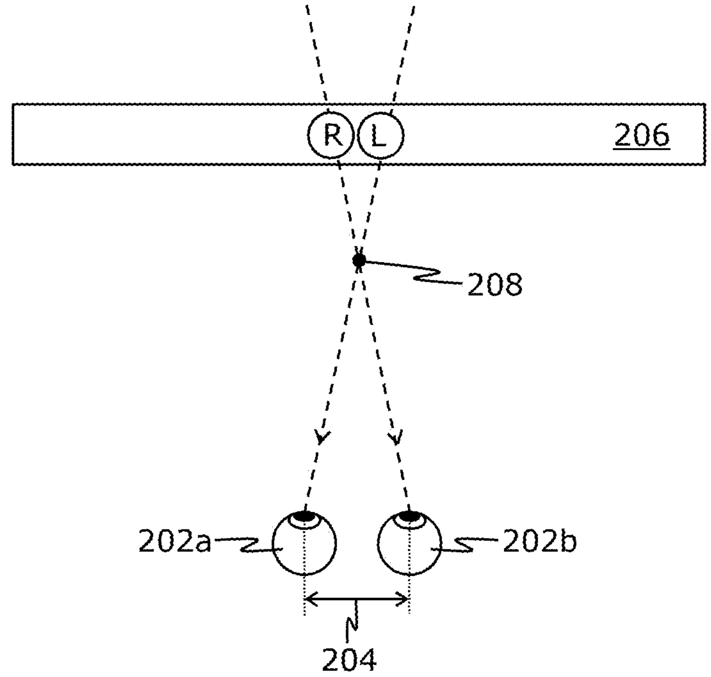

Referring to FIGS. 2A and 2B, illustrated is an exemplary scenario of how a user's eyes 202*a*-202*b* can be guided to focus correctly, in accordance with an embodiment of the present disclosure. An interpupillary distance 204 between the user's eyes 202*a*-202*b* is shown. A synthetic light field produced by a light field display unit 206 presents a virtual object 208 (shown in a form of a dot, for illustration purposes only). With reference to FIGS. 2A and 2B, for sake of simplicity and clarity, only a portion of the light field display unit 206 is shown in one dimension.

A distance between the virtual object 208 and the user's eyes 202*a*-202*b* is smaller than a native optical depth of the light field display unit 206. However, as shown in FIG. 2A, the user's eyes 202*a*-202*b* focus incorrectly at another point 210. Thus, it is detected that a difference between a focus depth at which the user is gazing and an optical depth at which the virtual object 208 is being presented is more than a predefined threshold difference. Such detection may be triggered when a deviation of a current gaze focus jitter (shown using double-sided curved arrow) from a baseline pattern of gaze focus jitter exceeds a predefined threshold deviation.

Upon said detection, at least one of: blurring, dimming is performed on a second virtual image to be presented to a non-dominant eye 202*b*. For illustration purposes only, the non-dominant eye 202*b* is shown as a right eye of the user, while a dominant eye 202*a* is shown as a left eye of the user. A current light field image that is generated by utilising the second virtual image and a first virtual image to be presented to the dominant eye 202*a* is displayed by the light field display unit 206. This guides the dominant eye 202*a* to focus correctly at the virtual object 208, as shown in FIG. 2B.

It will be appreciated that when the virtual object 208 is displayed at an optical depth that is smaller than the native optical depth of the light field display unit 206, a position of a left pixel L that corresponds to the dominant eye 202*a* and a position of a right pixel R that corresponds to the non-dominant eye 202*b* are swapped. This is because when the optical depth at which the virtual object 208 is being presented is smaller than the native optical depth, a disparity between the left pixel L (namely, a given pixel of a first set of pixels that corresponds to the dominant eye 202*a*) and the right pixel R (namely, a given pixel of a second set of pixels that corresponds to the non-dominant eye 202*b*) is negative.

FIGS. 2A-2B are merely examples, which should not unduly limit the scope of the claims herein. A person skilled in the art will recognize many variations, alternatives, and modifications of embodiments of the present disclosure.

Figure 3:
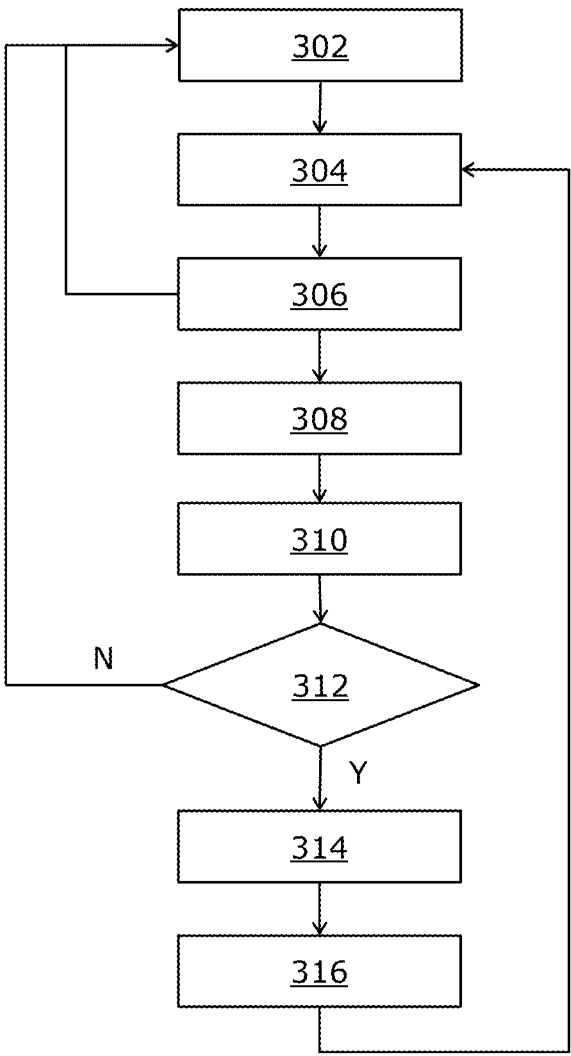
FIG. 3 illustrates steps of a method for facilitating autostereoscopy with focus depth guidance based on eye dominance, in accordance with an embodiment of the present disclosure.

Referring to FIG. 3, illustrated are steps of a method for facilitating autostereoscopy with focus depth guidance based on eye dominance, in accordance with an embodiment of the present disclosure. At step 302, a relative location of a dominant eye and of a non-dominant eye of a given user with respect to an optical combiner is determined, by utilising tracking means. At step 304, a light field image is generated, based on the relative location of the dominant eye and of the non-dominant eye with respect to the optical combiner. At step 306, the light field image is displayed via a light field display unit to produce a synthetic light field presenting at least one virtual object, wherein the optical combiner is employed to reflect a first part and a second part of the synthetic light field towards the dominant eye and the non-dominant eye of the given user, whilst optically combining the first part and the second part of the synthetic light field with a real-world light field of a real-world environment, respectively. The steps 302, 304 and 306 are repeated for a given time period.

During the given time period, at step 308, gaze directions of the dominant eye and the non-dominant eye are determined, by utilising the tracking means. At step 310, a focus depth at which the given user is gazing is determined, based on the gaze directions of the dominant eye and the non-dominant eye. At step 312, it is detected, during the given time period, when a difference between the focus depth and a given optical depth at which the at least one virtual object is being presented is more than a predefined threshold difference. If, at step 312, it is detected that said difference is more than the predefined threshold difference, step 314 is performed. At step 314, a first virtual image and a second virtual image to be presented to the dominant eye and the non-dominant eye are generated, based on the relative location of the dominant eye and of the non-dominant eye with respect to the optical combiner, respectively. At step 316, at least one of: dimming, blurring is performed on the second virtual image to be presented to the non-dominant eye. Next, at step 304, a current light field image is generated by utilising the first virtual image and the second virtual image. At step 306, the current light field image is displayed via the light field display unit to produce a current synthetic light field presenting the at least one virtual object. The step 308 follows as described above.

If, at step 312, it is detected that said difference is not more than the predefined threshold difference, step 302 is performed. The steps are then performed as described above.

The aforementioned steps are only illustrative and other alternatives can also be provided where one or more steps are added, one or more steps are removed, or one or more steps are provided in a different sequence without departing from the scope of the claims herein.

The invention claimed is:

1. A system comprising:

tracking means;

a light field display unit;

an optical combiner arranged on an optical path of the light field display unit and on an optical path of a real-world light field of a real-world environment; and at least one processor configured to:

determine a relative location of a dominant eye and of a non-dominant eye of a given user with respect to the optical combiner, by utilising the tracking means;

generate a light field image, based on the relative location of the dominant eye and of the non-dominant eye with respect to the optical combiner;

display the light field image via the light field display unit to produce a synthetic light field presenting at least one virtual object, wherein the optical combiner is employed to reflect a first part and a second part of the synthetic light field towards the dominant eye and the non-dominant eye of the given user, whilst optically combining the first part and the second part of the synthetic light field with the real-world light field, respectively;

repeat the steps of determining, generating and displaying for a given time period;

determine gaze directions of the dominant eye and the non-dominant eye during the given time period, by utilising the tracking means;

determine a focus depth at which the given user is gazing, based on the gaze directions of the dominant eye and the non-dominant eye;

detect, during the given time period, when a difference between the focus depth and a given optical depth at which the at least one virtual object is being presented is more than a predefined threshold difference; and when it is detected that said difference is more than the predefined threshold difference, generate a first virtual image and a second virtual image to be presented to the dominant eye and the non-dominant eye, based on the relative location of the dominant eye and of the non-dominant eye with respect to the optical combiner, respectively;

perform at least one of: dimming, blurring, on the second virtual image to be presented to the non-dominant eye;

generate a current light field image by utilising the first virtual image and the second virtual image; and display the current light field image via the light field display unit to produce a current synthetic light field presenting the at least one virtual object.

2. The system of claim 1, wherein the at least one processor is configured to:

when it is detected that said difference is more than the predefined threshold difference, generate a sequence of pairs of first virtual images and second virtual images to be presented to the dominant eye and the non-dominant eye, based on a sequence of relative locations of the dominant eye and of the non-dominant eye with respect to the optical combiner, respectively, wherein an optical depth at which the at least one virtual object is presented in an N+1$^{th}$ pair of said sequence is closer to the given optical depth and farther away from the focus depth, as compared to an optical depth at which the at least one virtual object is presented in an $N^{th}$ pair of said sequence, generate a sequence of light field images by utilising respective pairs of the first virtual images and the second virtual images of said sequence; and display the sequence of light field images via the light field display unit to produce a sequence of synthetic light fields presenting the at least one virtual object.

3. The system of claim 1, wherein the at least one processor is configured to:

when it is detected that said difference is more than the predefined threshold difference, determine a first set of pixels and a second set of pixels in the current light field image that correspond to the dominant eye and the non-dominant eye, respectively; and when generating the current light field image, generate intensity values for a subset of the second set of pixels in the current light field image, based on intensity values of the first virtual image to be presented to the dominant eye.

4. The system of claim 3, wherein the light field display unit comprises a multiscopic optical element, wherein the at least one processor is configured to control the multiscopic optical element, based on the relative location of the dominant eye and of the non-dominant eye with respect to the optical combiner, to direct light produced by the first set of pixels and said subset of the second set of pixels of the current light field image towards the dominant eye, whilst directing light produced by a remainder of the second set of pixels towards the non-dominant eye.

5. The system of claim 1, wherein the at least one processor is configured to:

when it is detected that said difference is more than the predefined threshold difference, perform at least one of: image sharpening, contrast enhancement, edge enhancement, on the first virtual image to be presented to the dominant eye.

6. The system of claim 1, wherein the at least one processor is configured to:

detect when the given optical depth at which the at least one virtual object is being presented is smaller than a native optical depth of the light field display unit from the given user; and when it is detected that the given optical depth is smaller than the native optical depth, trigger the steps of determining the gaze directions, determining the focus depth, and detecting when said difference is more than the predefined threshold difference.

7. The system of claim 1, wherein the at least one processor is configured to:

determine a baseline pattern of gaze focus jitter for the given user, the baseline pattern indicating at least one of: an amount, a duration for gaze focus jitter;

detect, during the given time period, when a deviation of a current gaze focus jitter from the baseline pattern exceeds a predefined threshold deviation; and when it is detected that said deviation exceeds the predefined threshold deviation, trigger the steps of determining the gaze directions, determining the focus depth, and detecting when said difference is more than the predefined threshold difference.

8. A method comprising:

determining a relative location of a dominant eye and of a non-dominant eye of a given user with respect to an optical combiner, by utilising tracking means, wherein the optical combiner is arranged on an optical path of a light field display unit and on an optical path of a real-world light field of a real-world environment;

generating a light field image, based on the relative location of the dominant eye and of the non-dominant eye with respect to the optical combiner;

displaying the light field image via the light field display unit to produce a synthetic light field presenting at least one virtual object, wherein the optical combiner is employed to reflect a first part and a second part of the synthetic light field towards the dominant eye and the non-dominant eye of the given user, whilst optically combining the first part and the second part of the synthetic light field with the real-world light field, respectively;

repeating the steps of determining, generating and displaying for a given time period;

determining gaze directions of the dominant eye and the non-dominant eye during the given time period, by utilising the tracking means;

determining a focus depth at which the given user is gazing, based on the gaze directions of the dominant eye and the non-dominant eye;

detecting, during the given time period, when a difference between the focus depth and a given optical depth at which the at least one virtual object is being presented is more than a predefined threshold difference; and when it is detected that said difference is more than the predefined threshold difference, generating a first virtual image and a second virtual image to be presented to the dominant eye and the non-dominant eye, based on the relative location of the dominant eye and of the non-dominant eye with respect to the optical combiner, respectively;

performing at least one of: dimming, blurring, on the second virtual image to be presented to the non-dominant eye;

generating a current light field image by utilising the first virtual image and the second virtual image; and displaying the current light field image via the light field display unit to produce a current synthetic light field presenting the at least one virtual object.

9. The method of claim 8, further comprising:

when it is detected that said difference is more than the predefined threshold difference, generating a sequence of pairs of first virtual images and second virtual images to be presented to the dominant eye and the non-dominant eye, based on a sequence of relative locations of the dominant eye and of the non-dominant eye with respect to the optical combiner, respectively, wherein an optical depth at which the at least one virtual object is presented in an $N+1^{th}$ pair of said sequence is closer to the given optical depth and farther away from the focus depth, as compared to an optical depth at which the at least one virtual object is presented in an $N^{th}$ pair of said sequence, generating a sequence of light field images by utilising respective pairs of the first virtual images and the second virtual images of said sequence; and displaying the sequence of light field images via the light field display unit to produce a sequence of synthetic light fields presenting the at least one virtual object.

10. The method of claim 8, further comprising:

when it is detected that said difference is more than the predefined threshold difference, determining a first set of pixels and a second set of pixels in the current light field image that correspond to the dominant eye and the non-dominant eye, respectively; and when generating the current light field image, generating intensity values for a subset of the second set of pixels in the current light field image, based on intensity values of the first virtual image to be presented to the dominant eye.

11. The method of claim 10, further comprising controlling a multiscopic optical element of the light field display unit, based on the relative location of the dominant eye and of the non-dominant eye with respect to the optical combiner, to direct light produced by the first set of pixels and said subset of the second set of pixels of the current light field image towards the dominant eye, whilst directing light produced by a remainder of the second set of pixels towards the non-dominant eye.

12. The method of claim 8, further comprising:

when it is detected that said difference is more than the predefined threshold difference, performing at least one of: image sharpening, contrast enhancement, edge enhancement, on the first virtual image to be presented to the dominant eye.

13. The method of claim 8, further comprising:

detecting when the given optical depth at which the at least one virtual object is being presented is smaller than a native optical depth of the light field display unit from the given user; and when it is detected that the given optical depth is smaller than the native optical depth, triggering the steps of determining the gaze directions, determining the focus depth, and detecting when said difference is more than the predefined threshold difference.

14. The method of claim 8, further comprising:

determining a baseline pattern of gaze focus jitter for the given user, the baseline pattern indicating at least one of: an amount, a duration for gaze focus jitter;

detecting, during the given time period, when a deviation of a current gaze focus jitter from the baseline pattern exceeds a predefined threshold deviation; and when it is detected that said deviation exceeds the predefined threshold deviation, triggering the steps of determining the gaze directions, determining the focus depth, and detecting when said difference is more than the predefined threshold difference.

* * * * *